United States Patent [19]

Butkus

[11] Patent Number: 5,021,375

[45] Date of Patent: Jun. 4, 1991

[54] CHROME OXIDE REFRACTORY COMPOSITION

[75] Inventor: Anthony K. Butkus, Worcester, Mass.

[73] Assignee: Norton Company, Worcester, Mass.

[21] Appl. No.: 512,236

[22] Filed: Apr. 19, 1990

[51] Int. Cl.$^5$ .............................................. C04B 35/12
[52] U.S. Cl. ..................................... 501/132; 501/115
[58] Field of Search ..................... 501/110, 115, 132

[56] References Cited

U.S. PATENT DOCUMENTS

| | | | |
|---|---|---|---|
| 3,759,728 | 9/1973 | Miller et al. | 501/115 |
| 3,773,531 | 11/1973 | Manigault | 501/132 X |
| 4,366,256 | 12/1982 | Mortl | 501/115 |
| 4,435,514 | 3/1984 | Hartline | 501/117 |
| 4,490,474 | 12/1984 | Staten | 501/112 |
| 4,544,643 | 10/1985 | Fraser | 501/127 |
| 4,724,224 | 2/1988 | Staley, Jr. et al. | 501/132 |
| 4,792,538 | 12/1988 | Pavlica et al. | 501/132 X |

*Primary Examiner*—Karl Group
*Attorney, Agent, or Firm*—Arthur A. Loiselle, Jr.

[57] ABSTRACT

Chrome oxide refractory materials which are a mixture of coarse fused chrome oxide particles and fine chrome oxide particles are disclosed as resistant to silica attack. The refractory materials have a $Cr_2O_3$ content of at least about 98.5% and substantially no MgO.

17 Claims, No Drawings

CHROME OXIDE REFRACTORY COMPOSITION

BACKGROUND OF THE INVENTION

The present invention is directed to a chrome oxide refractory material having improved resistance to attack by silica slags than the prior spinel-containing co-fused chrome oxide refractory materials.

Fused cast refractories are well known in the art. Such refractories which are generally based upon a spinel structure have demonstrated advantages over the older refractory materials which comprise granular heat-resistant materials bonded in desired shapes with other heat resistant ceramic materials Because of their relatively dense spinel structure, co-fused cast refractories have been found to be substantially resistant to attack by corrosive melts such as glass and molten metal oxides. Many different compositions for co-fused cast refractories have been made and it has been found that certain compositions are superior to others for specific uses.

For example, co-fused chrome oxide-magnesia spinel grain in a chrome oxide matrix has been found to be generally effective in high temperature applications and environments that include slags containinq silicas, aluminas, and calcias. While generally effective in this particular application, the co-fused chrome oxide-magnesia is not free of problems. In severe cases a chemical reaction has been found to occur in which the magnesia of the chrome oxide-magnesia spinel leaves the spinel and combines with silica, alumina, or calcia, thereby weakening the refractory grain and resulting in cracking The prior art believes that the spinel structure of the co-fused particles was the most stable form and does not recognize that this is not accurate, especially in view of the increased severity of conditions in which the refractories are currently expected to perform.

U.S. Pat. No. 4,490,474 discloses a co-fused cast ceramic composition comprising about 68-98 weight % $Cr_2O_3$, 0.75-4 weight % MgO, and 1-34.25 weight % alumina. While containing a relatively high percentage of $Cr_2O_3$, the co-fused composition also contains a high concentration of MgO along with a substantial amount of alumina. Thus it is not sufficiently resistant to attack for certain applications.

U.S. Pat. No. 3,773,531 discloses a refractory material with a high concentration of chromic oxide and no magnesia. However, the refractory is not a fused material, but rather a simple mixture of different materials cast into a block. Such a non-fused material lacks the dense fused structure necessary to resist severe corrosion.

U.S. Pat. No. 4,435,514 discloses a co-fused chromia-magnesia refractory product which contains a high percentage of magnesia, preferably in the range of 10 to 25% by weight.

U.S. Pat. No. 4,544,643 discloses a co-fused refractory product having low amounts of magnesia but also relatively low amounts of chromic oxide, i.e. no higher than 85% by weight. The composition also contains high amounts of alumina, i.e. 15-55 weight %. The alumina has been found to react with the silica of silica-containing slags and form spinels that degrade the refractory in a similar manner to the magnesia spinels discussed above.

U.S. Pat. Nos. 4,366,256, 3,759,728 and Japanese Patent 80045518 each discloses co-fused chromia refractory compositions containing relatively high amounts of magnesia.

Thus, the previous fused refractories have contained substantial amounts of oxides other than chromia in the belief that the co-fusion of chromia with the oxides was advantageous since it would cause chromia spinels to form which were believed to provide the most stable structures. It has now been discovered that the presence of these other oxides, especially magnesia, is detrimental to the performance of the resultant bodies in certain severe environments since the other oxides do not remain within the chromia spinels but rater are removed by reaction with the silica (and other oxides) and form new silica (and other) spinels, thereby weakening the original refractory structures.

DISCLOSURE OF THE INVENTION

The present invention solves the problem of silica interaction with the magnesia in co-fused chromia refractories by substantially eliminating any magnesia from the refractory composition and employing a very high percentage of chrome oxide rather than merely replacing the magnesia with some other oxide as in prior refractory bodies which have contained low levels of magnesia. According to the present invention, a refractory product composed of fused chrome oxide grains in a chrome oxide matrix is formed. As used herein the term "fused" refers to a material which is obtained by heating a starting material to its molten state, pouring the molten material into a vessel or mold, and then letting the material solidify in the vessel or mold. The chrome refractories of this invention generally contain chrome oxide in an amount of more than about 98.5 weight %, preferably about 99% or more, and MgO in an amount of less than about 0.5 weight %, preferably less than about 0.2%, and most preferably less than about 0.1%.

The resulting product has numerous uses in high temperature and severely corrosive environments, particularly including as a lining for electric furnaces, degassing vessels, glass furnace regenerators, coal gasification plants, and both atmospheric and pressurized fluidized bed boilers.

Reference will now be made to the preferred embodiments of this invention. The chrome oxide refractory product is basically composed of two parts, a coarse fused chrome oxide grain and a fine chrome oxide matrix. The coarse fused chrome oxide grain portion gives the refractory product chemical stability while the fine portion, sometimes referred to as the matrix, binds the product together, while not deleteriously effecting the chemical stability. The coarse fused chrome oxide grain is generally present in an amount of from about 50 to 90 weight %, more preferably in an amount of from about 60 to 80 weight %, and most preferably in an amount of from about 65 to 75 weight %. The fine chrome oxide is generally present in an amount of from about 10 to 50 weight %, more preferably in an amount of from about 20 to 40 weight %, and most preferably in an amount of from about 25 to 35 weight %.

The fused chromia grain particles used herein may be prepared by any manner known in the art. One suitable such method entails melting the chromia, casting it into an ingot, and then crushing the ingot to form the grains. Thus a high purity chrome oxide raw material may be electrically fused by conventional means comprising heating the raw material into a molten state, casting it into a suitable mold followed by controlled cooling to produce blocks and shapes having a high degree of crystallinity and density. The fused material may then be crushed and sized, generally to a range of particle sizes. The fused grain will normally be used in a mixture of particle sizes to improve the packing density of the particles. The maximum size of the grain particles is not critical provided that there is a sufficient mixture of particle sizes so that a dense packed mixture can be formed in which the porosity is relatively low, i.e. generally less than about 20%. The chrome oxide is fused in the substantial absence of other co-fusing oxides. "Substantial absence" is used herein to indicate that only trace impurity levels of other co-fusing oxides may be present. Generally all coarse particles will pass through a 3.5 mesh screen (sieve openings of 5.6 mm).

Preferably, the fused grain particles will be used in a mixed particle size distribution in which about 20 to 45 weight % will pass 3.5 mesh but not pass 6 mesh (sieve openings 3.35 mm), about 10 to 35 weight % will pass 6 mesh but not pass 45 mesh (sieve openings 328 microns), about 10 to 30 weight % will pass 45 mesh but not pass 100 mesh (sieve openings 150 microns), and up to about 10 weight % that will pass 100 mesh.

The fine chrome oxide is produced from fine (i.e. less than about 150 microns) particles of chromia or a source of chromia. The chromia or chromia source preferably should have a particle size of less than about 15 microns, more preferably about 5 microns or less, and most preferably about 1 micron or less. The chromia needs to be sufficiently fine to readily react with the coarse chrome oxide grains at the firing temperature to which they will be subjected, but not so fine as to be reactive therewith at ambient temperature.

To prepare the refractory bodies of this invention, the fused chromia grain particles and the fine chromia particles are simply mixed together, formed into the desired shape, and fired at an elevated temperature. The fused grain and the fine chromia particles may be combined by utilizing Dinger, Funk and Funk's Alfred University Distribution Equation to give a low porosity particle packing of from about 5 to 20% porosity. Oftentimes the forming will be accomplished by the addition of water, surfactants, temporary binders such as Swift's colloid (animal glue) or a 25% dextrin-water solution, and similar such forming additives which will be removed during the subsequent firing of the green body. Generally, up to about 10, preferably only up to about 6, parts by weight forming additives are used.

The green refractory products can be shaped or placed by all of the usual techniques such as pressure molding, casting, tamping, ramming, hydraulic pressing, and the like, in molds that absorb or do not absorb water, allowing for a variety of shapes at a reasonable cost. The cast or pressed shape is then dried, preferably at a temperature of from about 100° to 150° F. for about 14 to 48 hours. Drying is carried out by any suitable means. The dried product is then fired by conventional means, preferably at a temperature of from about 1300° to 1800° C. for about 2 to 6 hours.

It is essential that both the fused grain and the fine matrix materials be highly pure, since the quality of the final product is directly related to the degree of impurity. Thus the final product should be at least about 98.5% or more chromia, preferably at least about 99%, and have an MgO content of less than about 0.5%, preferably less than about 0.2%, and most preferably less than about 0.1%, all percents being by weight.

Preferably the alumina and calcia contents are also each less than about 0.2%, more preferably less than about 0.1%.

A typical analysis of a fired refractory product of this invention containing fused chrome oxide grains in a chrome oxide matrix is as follows:

TABLE 1

| Chemical Analysis (wt. %) | |
|---|---|
| $SiO_2$ | .20 |
| $Fe_2O_3$ | .10 |
| $TiO_2$ | .01 |
| $Al_2O_3$ | .06 |
| CaO | .05 |
| MgO | .03 |
| $Na_2O$ | .03 |
| C | .04 |
| $Cr_2O_3$ | 99.48 |

The following examples, in which all parts and percents are by weight unless otherwise specified, serve to illustrate and not limit the present invention.

Example I

A fused chrome oxide refractory body is prepared by cold pressing the following composition:

| Ingredient | Parts |
|---|---|
| Fused chromia (−3.5 + 6) | 33 |
| Fused chromia (−6 + 45) | 20 |
| Fused chromia (−45 + 100) | 17 |
| Fine chromia (−800) | 30 |
| Swift's colloid (animal glue) | 4 |

The above composition is mixed, cold pressed into shape, and then fired at about 1750° C. for 4 hours. The properties of the refractory body thus formed are:

| Property | Result |
|---|---|
| Density | 4.06 g/cc |
| Modulus of Elasticity | 45 GPa |
| 20° C. Modulus of Rupture | 1336 psi |
| 1450° C. Modulus of Rupture | 768 psi |

Standard wet chemical analyses are performed on the refractory body and the composition is found to contain 99.39% chromia and only 0.07% magnesia.

To evaluate the resistance to slag of the refractory body, it is subjected to a 6 hour drip slag test at 1550° C. using an artificial western type slag. The test is as detailed in A.S.T.M. C768-85 except that (i) the artificial black mesa slag is used in powder form (rather than a rod) and it "drips" into a reaction crucible where it becomes viscous and then flows onto the sample and (ii) a low oxygen partial pressure of $10^{-4}$ atmospheres is used to increase the severity of the test.

Standard wet chemical analyses are performed on the refractory body and the composition contains 99.51% chromia and only 0.07% magnesia.

The results show only slight silica penetration and no observed surface erosion.

EXAMPLE II

A refractory body is produced by vibrocasting a complex shape from the same composition as in Example I except that the Swift's colloid is replaced by 0.15 parts Darvan 811-D deflocculant and 4.3 parts water. The pH of the mixture is adjusted to 10-11 before vibrocasting. The deflocculant is a conventional sodium acrylate copolymer surfactant from R.T. Vanderbilt Co. The resultant mixture is thixotropic and flows under vibration.

The properties of the refractory body thus formed after firing at 1750° C. for 5 hours are:

| Property | Result |
|---|---|
| Density | 4.21 g/cc |
| Modulus of Elasticity | 62 GPa |
| 20° C. Modulus of Rupture | 1834 psi |
| 1450° C. Modulus of Rupture | 660 psi |

The results of the slag drip test as in Example I are essentially the same.

Wet chemical analyses indicates a chromia content of 99.46%, a magnesia content of 0.04%, an alumina content of 0.05%, and a calcia content of 0.03%.

What is claimed is:

1. A chrome based refractory composition resistant to attack by silica comprising a mixture of fused chrome oxide particles in a matrix of fine chrome oxide particles, wherein the composition is at least about 98.5% by weight chrome oxide, the magnesia content is less than about 0.5% by weight, and the chrome oxide is fused in the substantial absence of other oxides.

2. The composition of claim 1 wherein the fused chrome oxide particles have a particle size of from about 8 mm to about 150 microns and the chrome oxide matrix has a particle size of less than about 150 microns, the fused chrome oxide being present in an amount of from about 50 to 90 weight % and the chrome oxide matrix being present in an amount of from about 10 to 50 weight %.

3. The composition of claim 2 wherein the chrome oxide content is greater than 99% by weight of the composition and the MgO content is less than about 0.2% by weight.

4. The composition of claim 3 wherein the MgO content of the composition is less than about 0.1% by weight.

5. The composition of claim 2 wherein the fine chrome oxide has a particle size less than about 15 microns.

6. The composition of claim 2 wherein the fine chrome oxide has a particle size less than about 5 microns.

7. The composition of claim 2 wherein the fine chrome oxide has a particle size less than about 1 micron.

8. The composition of claim 2 wherein the coarse fused chrome oxide particles are present in a mixed particle size distribution in which about 20 to 45 weight % will pass 3.5 mesh but not pass 6 mesh, about 10 to 35 weight % will pass 6 mesh but not pass 45 mesh, about 10 to 30 weight % will pass 45 mesh but not pass 100 mesh, and up to about 10 weight % will pass 100 mesh.

9. The composition of claim 1 wherein the fused chrome oxide particles are present in an amount of about 60 to 80 weight % and the fine chrome oxide particles are present in an amount of about 20 to 40 weight percent.

10. The composition of claim 1 which contains less than about 0.2 weight % of each of alumina and calcia.

11. A raw batch refractory mix comprising about 50 to 90 weight % of grains of fused chrome oxide which have been fused in the substantial absence of any other oxide and about 50 to 10 weight % of a finely particulate source of chromia.

12. The raw batch of claim 11 wherein said grains are present in an amount of from about 60 to 80 parts by weight, said fine chromia source is present in an amount of from about 40 to 20 parts by weight, and alumina is present in an amount up to about 5 parts by weight.

13. The raw batch of claim 12 wherein said grains consist essentially of chrome oxide.

14. The raw batch of claim 11 wherein said grains have a particle size distribution of about 20 to 45 weight % will pass 3.5 mesh but not pass 6 mesh, about 10 to 35 weight % will pass 6 mesh but not pass 45 mesh, about 10 to 30 weight % will pass 45 mesh but not pass 100 mesh, and up to about 10 weight % will pass 100 mesh.

15. The raw batch of claim 11 wherein said grains are present in an amount of from about 65 to 75% by weight and said fine chromia source is present in an amount of from about 35 to 25% by weight.

16. The raw batch of claim 11 further comprising up to about 10 parts by weight of a forming additive per 100 parts by weight total of said grains and said fine chromia source.

17. The raw batch of claim 11 wherein the fine chromia source has an average particle size of about 1 micron or less.

* * * * *